US008948178B2

(12) United States Patent
Mark et al.

(10) Patent No.: US 8,948,178 B2
(45) Date of Patent: Feb. 3, 2015

(54) NETWORK CLUSTERING

(75) Inventors: Peter D. Mark, Seattle, WA (US);
Jeremy Bruestle, Seattle, WA (US);
Frank Laub, Seattle, WA (US)

(73) Assignee: CoCo Communications Corp., Seattle, WA (US)

( * ) Notice: Subject to any disclaimer, the term of this patent is extended or adjusted under 35 U.S.C. 154(b) by 187 days.

(21) Appl. No.: 13/562,018

(22) Filed: Jul. 30, 2012

(65) Prior Publication Data

US 2012/0300671 A1    Nov. 29, 2012

Related U.S. Application Data

(63) Continuation of application No. 12/160,597, filed as application No. PCT/US2005/047488 on Dec. 29, 2005, now Pat. No. 8,233,480.

(60) Provisional application No. 60/640,810, filed on Dec. 29, 2004.

(51) Int. Cl.
*H04L 12/28* (2006.01)
*H04L 12/751* (2013.01)
*G06Q 30/02* (2012.01)
*H04L 12/715* (2013.01)
*H04L 12/721* (2013.01)
*H04L 29/08* (2006.01)
*H04L 29/06* (2006.01)

(52) U.S. Cl.
CPC .............. *H04L 45/025* (2013.01); *G06Q 30/02* (2013.01); *H04L 45/02* (2013.01); *H04L 45/04* (2013.01); *H04L 45/12* (2013.01); *H04L 45/46* (2013.01); *H04L 67/327* (2013.01); *H04L 69/14* (2013.01); *H04L 67/20* (2013.01)
USPC ......................................................... 370/392

(58) Field of Classification Search
CPC ....................................................... H04L 12/58
USPC .......................................... 370/392; 455/466
See application file for complete search history.

(56) References Cited

U.S. PATENT DOCUMENTS

| 5,481,673 | A | 1/1996 | Michelson |
| 6,456,600 | B1 | 9/2002 | Rochberger et al. |
| 6,496,510 | B1 | 12/2002 | Tsukakoshi et al. |
| 7,184,421 | B1 * | 2/2007 | Liu et al. ........................ 370/338 |
| 2002/0049859 | A1 | 4/2002 | Bruckert et al. |
| 2002/0064149 | A1 * | 5/2002 | Elliott et al. ................... 370/352 |
| 2002/0112139 | A1 * | 8/2002 | Krause et al. ...................... 712/1 |
| 2003/0026268 | A1 | 2/2003 | Navas |
| 2004/0081152 | A1 | 4/2004 | Thubert et al. |
| 2004/0085961 | A1 | 5/2004 | Coffell et al. |
| 2005/0152286 | A1 | 7/2005 | Betts et al. |

* cited by examiner

*Primary Examiner* — Wei Zhao
(74) *Attorney, Agent, or Firm* — Lowe Graham Jones PLLC

(57) ABSTRACT

A network clustering facility is described. The network clustering facility receives a message having a location identification that identifies a destination for the message and comprises at least two components, selects a network node identified by the components of the location identification, determines whether a link exists to the selected network node, and identifies a best link to the selected network node. The network clustering facility comprises a clustering subsystem, an advertising subsystem, and a routing layer.

10 Claims, 5 Drawing Sheets

Routing table for node X

| Destination | Link | Cost |
|---|---|---|
| Y | direct | 1 |
| Y | via Z | 2 |
| Z | direct | 1 |
| Z | via Y | 3 |
| U | via Y | 4 |
| U | via Z | 2 |
| ⋮ | ⋮ | ⋮ |

*FIG. 5*

NETWORK CLUSTERING

PRIORITY CLAIM

This application is a Continuation of U.S. Utility Application entitled "NETWORK CLUSTERING," having application Ser. No. 12/160,597, filed on Jul. 10, 2008, and completed on Apr. 16, 2009, which will issue on Jul. 31, 2012 as U.S. Pat. No. 8,233,480, and which is a U.S. National Stage application of International Application No. PCT/US05/47488, entitled "NETWORK CLUSTERING," filed Dec. 29, 2005, which claims the benefit of U.S. Provisional Patent Application, entitled "NETWORK USING CLUSTERING AND ROUTING ADVERTISEMENT," having application Ser. No. 60/640,810, filed Dec. 29, 2004. Accordingly, the present application claims priority to and the benefit of the filing dates of U.S. application Ser. No. 12/160,597, International Application No. PCT/US05/47488, and Provisional Application No. 60/640,810, which are all incorporated by reference herein in their entireties.

BACKGROUND

Data communications networks employ various data communications protocols to transport data between computing devices ("network nodes") that are connected thereto. These protocols generally have various limitations, such as security, ability of network nodes to move, quality of service ("QOS"), and so forth. These limitations are generally improved by adding products or services at the operating system or other "application" level of multi-level data networking architectures. As an example, firewall software is sometimes used to improve security limitations of the Internet Protocol ("IP"). Notwithstanding these improvements, the network layer is commonly still vulnerable to various attacks because security, interoperability, and QOS, are interdependent. As an example, when the network layer is protected by implementing a security model, nodes that implement the security model may be unable to adequately exchange information with other nodes that do not implement the security model. Moreover, the security model may require a secure channel between two network nodes and the network may be unable to duplicate the secure channel during a subsequent connection between these network nodes, and thus QOS may be affected. Often, conventional application-level improvements come at the expense of scalability, interoperability, QOS, or other desirable attributes of flexible data communications networks.

BRIEF DESCRIPTION OF THE DRAWINGS

FIG. 5 is a table diagram illustrating an example of a routing table employed by the facility in some embodiments.

DETAILED DESCRIPTION

Figure 1:
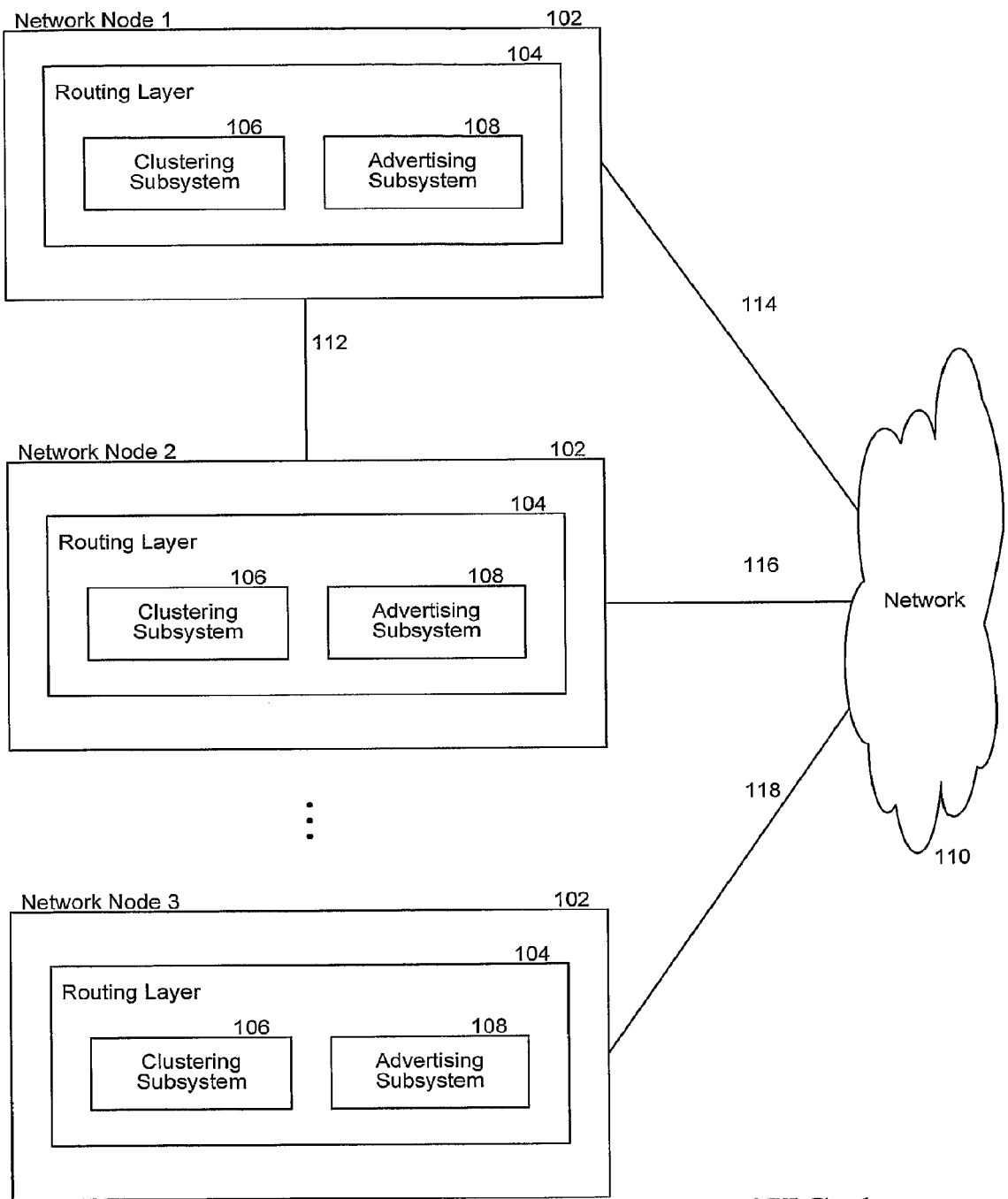
FIG. 1 is a block diagram illustrating an operating environment in which the facility operates in some embodiments.

A software facility for network clustering ("the facility") is provided. The facility employs a routing layer to create a clustering network. A clustering network is a data communications network in which network nodes are grouped into clusters and representative network nodes are identified in each cluster. The routing layer employs a clustering subsystem and an advertising subsystem to enable the facility to provide dynamic and scalable message routing.

The facility assigns a network location identification to each network node. The location identification of a network node identifies a sequence of network nodes that are representative of clusters with which the network node is associated, e.g., from "farthest" to "closest." Each network node identified in the location identification is referred to as a "component" of the location identification. The routing layer routes a message based on the location identification indicated as the destination network node for the message. The message may transit multiple network nodes from the source network node until the destination network node. At each network node that the message transits (excluding perhaps the destination node itself), the routing layer evaluates components of the destination's location identification from closest to farthest network node to identify a "best link" among a set of links that exist from the network node that the message transits to every other connected network node. A link may be an actual network connection between two network nodes. Proximity of two network nodes may be measured in terms of the number of links a message must traverse between the two network nodes, the amount of time the traversal requires, and so forth. The best link may be the link that has the least "cost," e.g., as measured in terms of time to transit, QOS, bandwidth, reliability, security, and so forth. The routing layer may then forward the message using the identified best link.

The clustering subsystem of the routing layer assigns a location identification to each network node when the network node is added to the network. The clustering subsystem may also change the assigned location identification, such as when the network node moves. By automatically adapting to topological changes, such as when network nodes are added, removed, or moved, the routing layer can provide dynamic message routing. As an example, when an optimal route between a source and destination nodes comprises a third network node that is removed from the clustering network (e.g., is turned off) or moves (e.g., is moved to another cluster), the facility is able to calculate an alternate route between the source and destination network nodes. As another example, when a network node is added to the clustering network (e.g., is turned on) and this added network node provides a lower cost link between the source and destination nodes, the facility enables messages between the source and destination nodes to transit the added network node. Moreover, because the routing layer automatically adapts to topological changes, single failures of network nodes may not disrupt network message traffic because the facility is "self-healing" in that it is able to identify new paths between any two network nodes. Thus, the facility provides dynamic message routing.

The advertising subsystem enables the routing layer to send, receive, and analyze advertising messages. Advertising messages are control messages that network nodes send to their peers to establish a cost of a link between the network nodes and other network nodes, such as their peers. Each network node may store a routing table containing costs for each link between it and other network nodes to which it is connected, such as via an actual network connection. When a sending network node (e.g., a source network node or a network node the message transits) sends or forwards a message to a receiving network node (e.g., a network node the message transits or the destination network node), the sending network node determines from its routing table a next network node the message can transit. Because each network node that the message transits selects a best link on which to forward the message, the message traverses a near-optimal route from the source network node to the destination network node. In some embodiments, the facility may select a link from the routing table that indicates the lowest cost.

The facility scales to large numbers of network nodes by ensuring that overhead associated with routing messages grows approximately proportionally with the length of the route between any two network nodes. The facility does this by limiting the propagation of advertising messages by using location information. As previously discussed, the location identification of a network node identifies a sequence of network nodes that are representative of clusters with which the network node is associated, e.g., from "farthest" to "closest." The facility may limit advertising message propagation based on a rank of the network node whose advertising message is being propagated. As an example, a representative network node's advertising message may be propagated to representative network nodes of adjacent clusters and to all network nodes associated with the advertising representative network node. On the other hand, location information of a network node that is not a representative network node may only be propagated to other network nodes in the same cluster as the network node.

The facility can route messages between network nodes even though none of the network nodes may possess a routing table that identifies all network nodes. The facility identifies a representative network node for each cluster of the clustering network. The representative network node is a network node that is connected to each of the other network nodes in the cluster. The facility identifies clusters and selects a representative network node for each cluster, e.g., during initialization or configuration. Once the facility forms an initial set of clusters, it can recursively or successively identify clusters from the previously identified clusters and select representative clusters. This recursive or successive clustering process results in a hierarchy of clusters and network nodes. The representative network nodes may be identified in the network location identification for some network nodes, such as network nodes that appear within the representative network node's cluster.

Turning now to the figures, FIG. 1 is a block diagram illustrating an operating environment for the facility in some embodiments. The operating environment includes at least two network nodes 102 that are either interconnected directly via link 112 or via a network 110 to which the network nodes are connected via links 114, 116, or 118. The network can be an intranet, the Internet, or indeed any form of data communications network. The links can be wireless or wired or any other form of link that can carry data.

Each network node includes a routing layer 104. The routing layer works in conjunction with other network-related components of the network node to provide a dynamic and scalable routing environment in a clustering network.

Each routing layer includes a clustering subsystem 106 and an advertising subsystem 108. The clustering subsystem establishes a hierarchy of clusters and assigns to each network node a network location identification based on the clusters that contain that network node. In some embodiments, a single or central clustering subsystem may assign network location identifications. The advertising subsystem enables the routing layer to send, receive, and analyze advertising messages. Advertising messages are control messages that network nodes send to their peers to establish a cost of a link between the network nodes and their peers.

Figure 2:
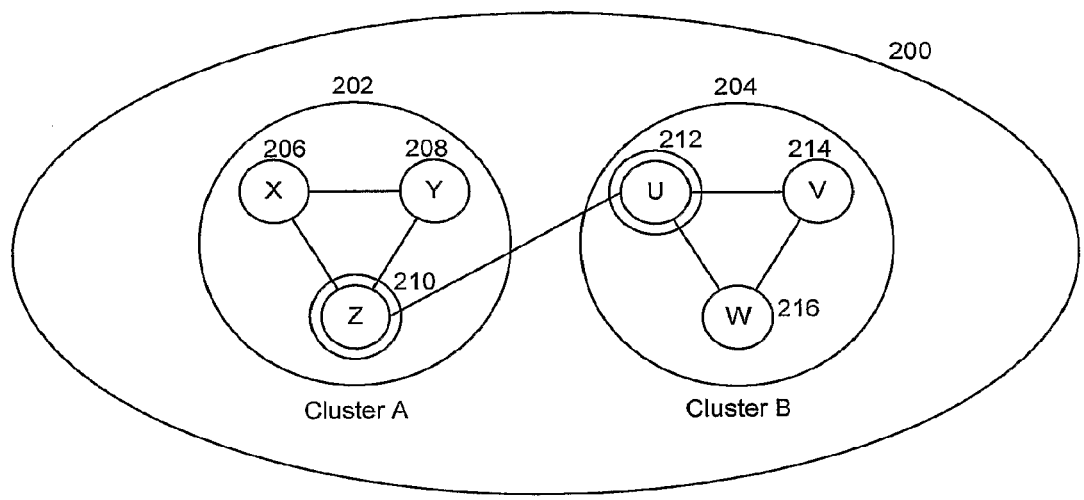
FIG. 2 is a network node diagram illustrating how network nodes may be interconnected.

FIG. 2 is a network node diagram illustrating how network nodes may be interconnected. A clustering network 200 has network nodes X 206, Y 208, Z 210, U 212, V 214, and W 216. One or more clustering subsystems have identified two clusters of network nodes: cluster A 202 and cluster B 204. Clustering subsystems have further identified network node Z as a representative network node of cluster A and network node U as a representative network node of cluster B, as identified by the double-concentric circles around each representative network node.

In some embodiments, a representative network node of a cluster is a network node that is interconnected with all other network nodes of the cluster. In these embodiments, a representative cluster of a group of interconnected clusters could be a cluster that is interconnected with the other clusters within the group. As an example, each of the network nodes illustrated in FIG. 2 could instead be clusters themselves.

Figure 3:
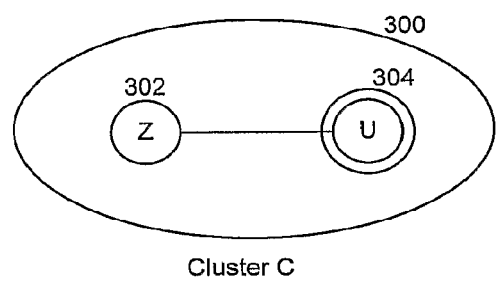
FIG. 3 is a network node diagram illustrating a representation of the network node diagram of FIG. 2.

FIG. 3 is a network node diagram illustrating a representation of the network node diagram of FIG. 2. During a recursive or successive step, one or more clustering subsystems have identified a Cluster C that contains representative network nodes Z and U (alternatively, representative clusters Z and U). Network node U is identified as a representative of cluster C.

Figure 4:
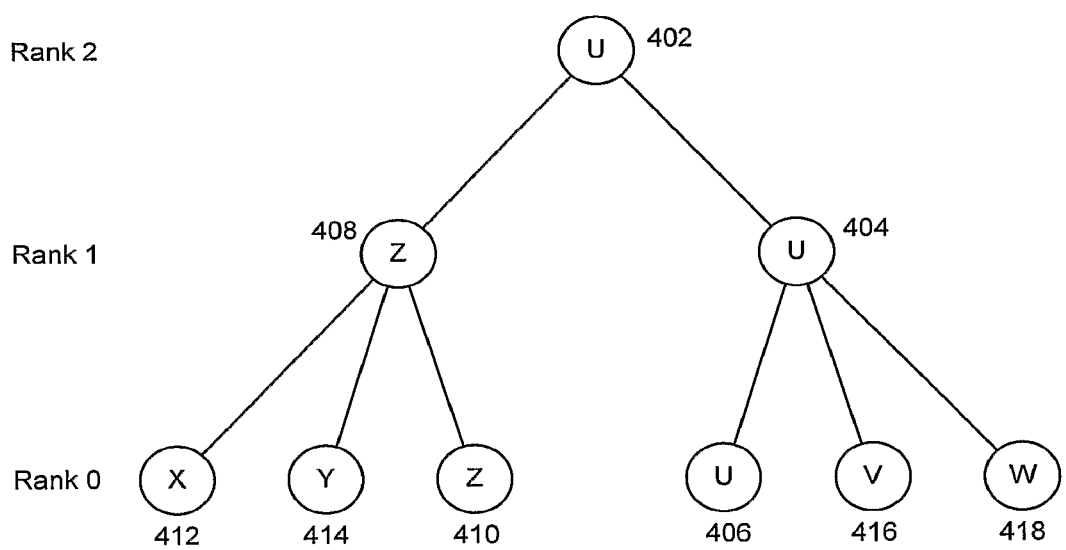
FIG. 4 is a graph diagram illustrating a hierarchical representation of the network nodes of FIG. 2.

FIG. 4 is a graph diagram illustrating a hierarchical representation of the network nodes of FIG. 2. The network nodes and clusters identified in relation to the network nodes can be represented hierarchically, such as in a graph or tree diagram. In the illustrated graph, clusters and network nodes are represented as vertices of the graph. Links between the clusters or network nodes are represented as edges of the graph. Each non-cluster network node occupies a leaf vertex of the graph. Each cluster (or representative network node of the cluster) occupies a non-leaf vertex of the graph.

According to the illustrated graph, vertex 408 identifies a cluster having representative network node Z and containing network nodes X, Y, and Z, which are identified by vertices 412, 414, and 410, respectively. Thus, vertex 408 defines cluster A of FIG. 2. Similarly, vertex 404 defines cluster B of FIG. 2 as it has representative network node U and contains network nodes U, V, and W, which are identified by vertices 406, 416, and 418, respectively. Vertex 402 defines cluster C of FIG. 3 because it has representative network node U and contains two clusters represented by network nodes Z and U.

The clustering subsystem may provide location identifications for each network node as follows. It may identify network node X (e.g., vertex 412) as [U.Z.X]. According to this network location, vertex 412's location is identified by components U, Z, and X. U is the farthest representative network node, Z is a closer representative network node, and X is the network node itself. The clustering subsystem may identify vertex 406 as [U.U.U] or simply [U].

Each vertex has a rank. A rank of a vertex (and hence the rank of the network node or representative network node the vertex represents) relates to its position in the cluster hierarchy. According to the illustrated graph, network node U at vertex 402 has rank 2, network nodes Z at vertex 408 and U at vertex 404 have rank 1, and the remaining vertices have rank 0. When a network node has multiple ranks, it can be considered to have its highest rank. As an example, although network node U has ranks 0, 1, and 2 (e.g., at vertices 406, 404, and 402, respectively), it may be considered to have a rank of 2. This rank information may be used by the advertising subsystem to determine how far to propagate advertising messages relating to the node. As an example, advertising messages of network nodes located at vertices with rank 0 may only be propagated to the representative network node of the cluster with which these rank 0 network nodes are associated (e.g., vertices 408 or 404) and perhaps also to other network nodes in the same cluster. However, advertising messages from network nodes having a rank of 2 may be propagated to all network nodes "below" that rank 2 network node in the cluster hierarchy. The facility may also provide these advertising messages to other network nodes, such as a network node that is one level higher. By limiting how far advertising messages are propagated, the facility enables greater scaling of the clustering network than would be possible if, for example, advertising messages were propagated to every network node. In various embodiments, the clustering subsystem may limit how advertising messages are propagated based on rank in other ways. By limiting advertising message propagation based on rank, the facility limits overhead associated with propagating these advertising messages. Moreover, as a result of this limited propagation, distribution of network knowledge is spread evenly throughout the clustering network rather than being concentrated at a single network node or small set of network nodes. As a result, no one network node or small set of network nodes has a list of all network nodes in the clustering network.

When a network node receives advertising messages, it updates its routing table. FIG. 5 is a table diagram illustrating an example of a routing table employed by the facility in some embodiments. The illustrated routing table is associated with network node X of FIG. 2. According to the table, network node X can send a message to network node Y directly or via network node Z. Alternatively, network node X can send a message to network node U via network nodes Y or Z. Each such link has an associated cost. As previously discussed, costs may be measured, e.g., by time to transit, QOS, bandwidth, reliability, security, and so forth.

In some embodiments, the table may additionally indicate a distance between network nodes, such as based on the number of edges of the hierarchy graph a message traverses between the two network nodes. As an example, the distance between nodes X and Z may be indicated as one whereas the distance between nodes X and either U or Y may be indicated as 2. Alternate ways of calculating distances exist.

While FIG. 5 and its discussion illustrate a table whose contents and organization are designed to make them more comprehensible by a human reader, those skilled in the art will appreciate that actual data structures used by the facility to store this information may differ from the table shown, in that they, for example, may be organized in a different manner, may contain more or less information than shown, may be compressed and/or encrypted, etc.

Figure 6:
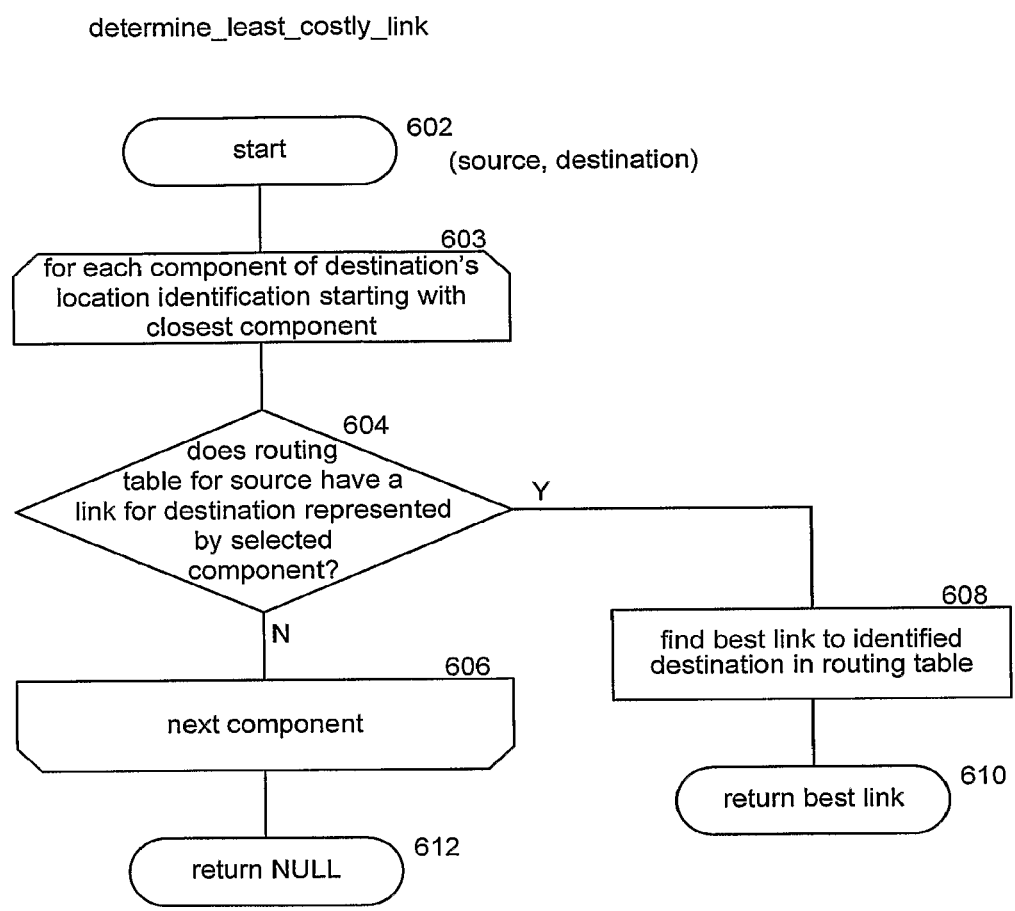
FIG. 6 is a flow diagram illustrating a determine_least_costly_link routine invoked by the facility in some embodiments.

FIG. 6 is a flow diagram illustrating a determine_least-_costly_link routine invoked by the facility in some embodiments. The routing layer may invoke the routine to determine a next network node to which to pass an incoming (or generated) message. The routine begins at block 602 where it receives indications of source and destination network nodes as parameters. In various embodiments, the routine may receive an indication of a maximum cost, required QOS, and so forth. In some embodiments, the routine may not need a source network node's identification as a parameter, e.g., because the routine is only invoked to determine a next network node to which to forward the message and an identification of a source network node is irrelevant in such a case.

Between the loop of 603-606, the routine attempts to identify the best link over which to forward the message. At block 603, the routine selects a component from the destination's location identification. The routine may start with the component of the location identification that identifies the network node that is closest to the network node that is forwarding the message, and work progressively to components identifying network nodes that are farther away. As previously discussed, proximity may be determined from the number of links that must be traversed, time for a message to transit the link, QOS, and so forth.

At block 604, the routine determines whether the routing table has a link for the selected component of the destination's location identification. When it finds a network node identified by a component that appears in the routing table associated with the network node that invoked the routine, the routine identifies that network node as a transit destination and continues at block 608. Otherwise, the routine continues at block 606.

If at block 606 all components of the destination's location identification have been processed, the routine returns a NULL (e.g., error) condition at block 612. Otherwise, the routine continues at block 604 after selecting the next component from the location identification.

At block 608, the routine finds the "best" link (e.g., a link with the lowest cost) to the transit destination identified by the loop and returns an indication of that best link at block 610. The routing layer may then forward the message to the transit destination.

The following provides an example of how the facility may employ the routine. Suppose network node W sends a message to network node X. Network node W would identify the destination of the message as [U.Z.X], which is the location of network node X. The routine would first select network node U because that is the closest network node to W. Because network node W would have a link to network node U (e.g., because it is in the same cluster), it forwards the message to U on the best link to U. The routing layer of network node U then invokes the routine and routes the message to network node Z on its best link. Network node Z then forwards the message to network node X, the destination, on its best link. Thus, the message arrives at its destination, network node X, even though network node W did not have an entry for network node X's location identification in its routing table. Moreover, the message traversed a nearly-optimal route.

As can be seen, the closer a message gets to the destination network node, the more refined will be the information relating to best links to the destination network node. Hence, the facility may route the message over a route that is not entirely defined by the destination network node's location identification. As an example, a network node the message transits may have a link to the destination address directly that is not identified by the location identification.

Those skilled in the art will appreciate that the steps shown in FIG. 6 and in its related discussion may be altered in a variety of ways. For example, the order of the blocks may be rearranged, additional logic may be performed in parallel, logic of shown steps may be omitted, or other steps may be included, etc.

The facility automatically adapts without human intervention when network nodes change locations by using an advertising system. Network nodes send advertising messages, e.g., periodically, to other network nodes. The network nodes that receive the advertising messages update their routing table based on this information.

In various embodiments an advertising subsystem of the facility maintains an advertisement edition comprising the most current and consistent set of advertising messages that network nodes have sent. This enables the facility to prevent various anomalies, such as routing loops and "counting to infinity" type problems.

In some embodiments, the facility may provide an application program interface, such as to identify a next hop for a message, notify the facility of changes in a network node's location, and so forth.

In some embodiments, the clustering network can be used to create a virtual private network.

In various embodiments, the clustering network is a hybrid data communications network that includes a heterogeneous collection of both wired and wireless network nodes linked together by a set of transport mechanisms including, but not limited to, Wi-Fi, Ethernet, satellite, and cellular links.

In various embodiments, the clustering network is distributed in that there is no single central authoritative network node, or set of authoritative network nodes, upon whose proper function the clustering network depends.

In various embodiments, the location identification of a network node is logically differentiated from the name given to the network node. In these embodiments, a message is routed based on the location identification of the network node.

While various embodiments are described in terms of the environment described above, those skilled in the art will appreciate that the facility may be implemented in a variety of other environments including a single, monolithic computer system, as well as various other combinations of computer systems or similar devices connected in various ways.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

Aspects of the invention can be modified, if necessary, to employ the systems, functions, and concepts of the various references described above to provide yet further embodiments of the invention.

These and other changes can be made to the invention in light of the above Detailed Description. While the above description describes certain embodiments of the invention, and describes the best mode contemplated, no matter how detailed the above appears in text, the invention can be practiced in many ways. Details of the systems described herein may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The invention claimed is:

1. A method performed by a computing system for message routing in a data communications network, the communications network having a plurality of clusters each having one representative network node and at least one other network node, wherein the representative network node of the cluster is interconnected using links with all other network nodes of its cluster, comprising:
   receiving a message with a location identification for the message, the location identification comprising at least a first component that identifies a destination network node for the message and a second component that identifies a representative network node that represents a cluster, and wherein the destination network node is a member of the cluster represented by the representative network node;
   selecting the representative network node identified by the second component of the location identification; and
   identifying a best link to the selected representative network node, wherein the best link is identified from routing information in a routing table, wherein the routing table comprises components identifying a subset of a set of network nodes associated with the data communications network; and
   communicating the message to the representative network node via the identified best link.

2. The method of claim 1, wherein the routing table comprises information identifying a plurality of other representative network nodes, wherein each one of the other representative network nodes is associated with a cluster, and wherein each cluster includes a plurality of other network nodes that are members of only that respective cluster.

3. The method of claim 1, wherein the routing table comprises information identifying the destination network node and a link between the destination network node and the selected representative network node.

4. A system for creating a clustering data communications network, the clustering data communications network having a plurality of clusters each with a plurality of network nodes, wherein each one of the plurality of clusters has one representative network node, wherein the representative network node is interconnected using links with all other network nodes of its respective cluster, and wherein the system is configured to add a network node into the clustering data communications network, the system comprising:
- a clustering subsystem that, for the added network node, is configured to identify a cluster with which the added network node is to be associated, that is configured to assign a location identification that identifies at least a representative network node for the cluster associated with the added network node, wherein the representative network node represents the cluster, and wherein the representative network node is configured to link to other representative network nodes of adjacent clusters;
- an advertising subsystem that, when the added network node initially being added to the clustering data communications network, is configured to send an advertising message from the added network node to indicate that the added network node exists in the clustering data communications network, and wherein the advertising message is received by one of the representative network nodes of the clustering data communications network, wherein the added network node is then associated with the cluster that the receiving representative network node represents; and
- a routing layer that is configured to maintain a routing table at the added network node, wherein the routing table includes information that associates the added network node and the representative network node, and identifies a link between the added network node and the representative network node.

5. The system of claim 4, wherein the routing table at the added network node, includes information that identifies other network nodes of its respective cluster.

6. The system of claim 4, wherein the advertising subsystem is further configured to receive other advertising messages from the other network nodes of its respective cluster, and wherein the routing layer is further configured to add to the routing table identification information of the other network nodes of its respective cluster.

7. The system of claim 4, wherein the representative network node is configured to identify other representative network nodes of adjacent clusters based upon received advertising messages sent by the other representative network nodes of the adjacent clusters, is configured to link to the other representative network nodes of the adjacent clusters, and wherein the advertising subsystem of the representative network node is configured to communicate advertising messages to the other representative network nodes of the adjacent clusters which identify the added network node as a member of the cluster represented by the advertising representative network node.

8. The system of claim 7, wherein the routing layers of the other representative network nodes of the adjacent clusters which receive the advertising message from the advertising representative network node are configured to update their respective routing tables to associate the added network node with the advertising representative network node.

9. The system of claim 4, where in response to the added network node being removed from the clustering data communications network, the advertising subsystem of the representative network node is further configured to communicate advertising messages to the other representative network nodes of the adjacent clusters, and wherein the routing layers of the other representative network nodes of the adjacent clusters which receive the advertising message from the advertising representative network node are configured to update their respective routing tables to remove information pertaining to the removed network node.

10. The system of claim 4, where in response to the added network node being removed from the clustering data communications network, the advertising subsystem of the representative network node is further configured to communicate advertising messages to the network nodes of its respective cluster which identifies the removed network node, and wherein the routing layers of the network nodes which receive the advertising message from the advertising representative network node are configured to update their respective routing tables to remove information pertaining to the removed network node.

* * * * *